United States Patent [19]

Burgin et al.

[11] 4,403,358
[45] Sep. 13, 1983

[54] END BAR

[75] Inventors: Ralph Burgin, West Point, Iowa; Timothy C. Dadant, Hamilton, Ill.

[73] Assignee: Dadant & Sons, Inc., Hamilton, Ill.

[21] Appl. No.: 328,602

[22] Filed: Dec. 8, 1981

[51] Int. Cl.³ ............................................. A01K 47/02
[52] U.S. Cl. ......................................................... 6/10
[58] Field of Search .............. 6/10, 2 R, 2 A; D30/2

[56] References Cited

U.S. PATENT DOCUMENTS

D. 261,182  10/1981  Guilfoyle .............................. D30/2
4,216,557   8/1980  Golde ....................................... 6/10

Primary Examiner—Hugh R. Chamblee
Attorney, Agent, or Firm—Fred Philpitt

[57] ABSTRACT

This invention pertains to end bars for bee foundation frames, such end bars containing locking means for securing the ends of cross bars in the end members.

1 Claim, 5 Drawing Figures

END BAR

BACKGROUND

For many years the support for bee foundations has consisted of two end bars, a top cross bar and a bottom cross bar. These four bars were originally all made of wood and were jointed into a rectangular framework by nailing. Examples of such support frames can be found in U.S. Pat. Nos. 1,725,448 and 1,782,202 and in the yearly supply catalogs of Dadant and Sons of Hamilton, Ill.

Recently such end bars have been made from plastic material because plastic end bars are light in weight, strong, durable easy to clean, etc. U.S. Pat. No. Des. 261,182 shows an end bar made from plastic which is presently being marketed. In this type of end bar the ends of wooden cross bars are press-fitted into the two sockets located in each end bar. However, since it is sometimes difficult to maintain the dimensions of the end of a wooden cross bar within the precise tolerances desired, the cross bar may fit too loosely in a socket of the end bar, with the result that the wooden cross bar may become disconnected from the end bar during normal handling and use. It is therefore an object of this invention to provide an end bar that has locking means which will inhibit dislodgement of the wooden cross bar from the end bar.

THE DRAWINGS

The present invention will be more clearly understood by reference to the attached drawings wherein FIGS. 1 and 2 are perspective views of my end bar;

THE PRESENT INVENTION

Figure 1:
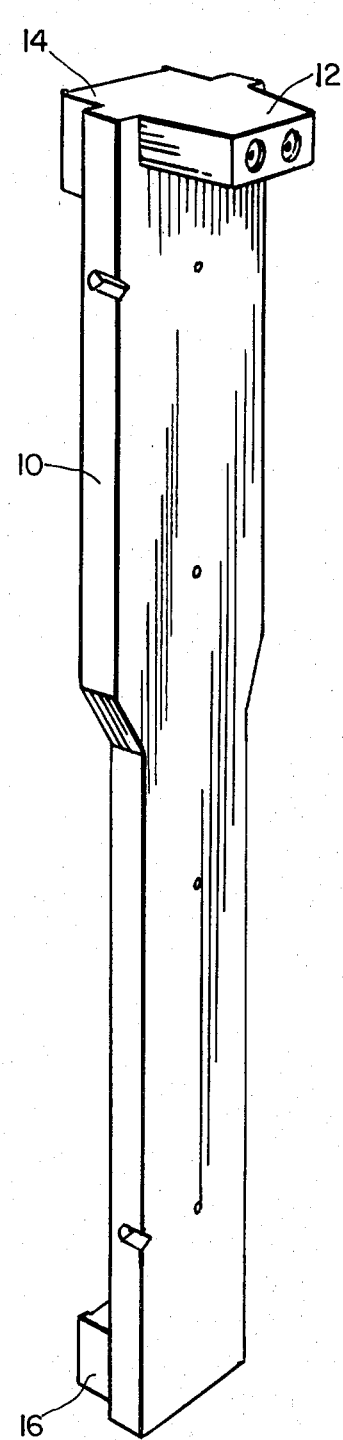

Considered from one standpoint the present invention pertains to an end bar for a bee foundation frame that includes (a) an upper rectangular socket which has about the same interior cross sectional area and configuration as the cross sectional area and configuration of the wood top cross bar that is to be inserted in the socket, (b) a lower rectangular socket which has about the same interior cross sectional area and configuration as the cross sectional area and configuration as the wooden bottom cross bar that is to be inserted in the socket, the improvement which comprises at least one locking projection located on the interior surface of one wall of each said socket, each locking projection being sloped upwardly as it extends inwardly into the socket and terminating in a pointed edge which is adapted to allow inward movement of a cross bar into the socket but which prevents withdrawal of a wooden cross bar from a socket.

Referring now to the drawing, end bar 10 is seen to have an upper socket 14 which is adapted to receive one end of a top cross bar (not shown) and a lower socket 16 that is adapted to receive one end of a bottom cross bar (not shown). The end bar is preferably made of plastic so as to be of light weight and durable. Hangers 12 facilitate support within a beehive. As can be seen, there is extensive reinforcing with ribs along the lengths of the end bar. Reference is made to U.S. Pat. No. Des. 261,182 for this known type of end bar.

Both upper socket 14 and lower socket 16 are of rectangular configuration and each have about the same interior cross sectional area and configuration as the cross sectional area and configuration of the ends of the cross bars that are to be inserted into them. The sockets are preferably only slightly larger than the ends of the cross bars so as to insure a fairly tight fit.

Figure 2:
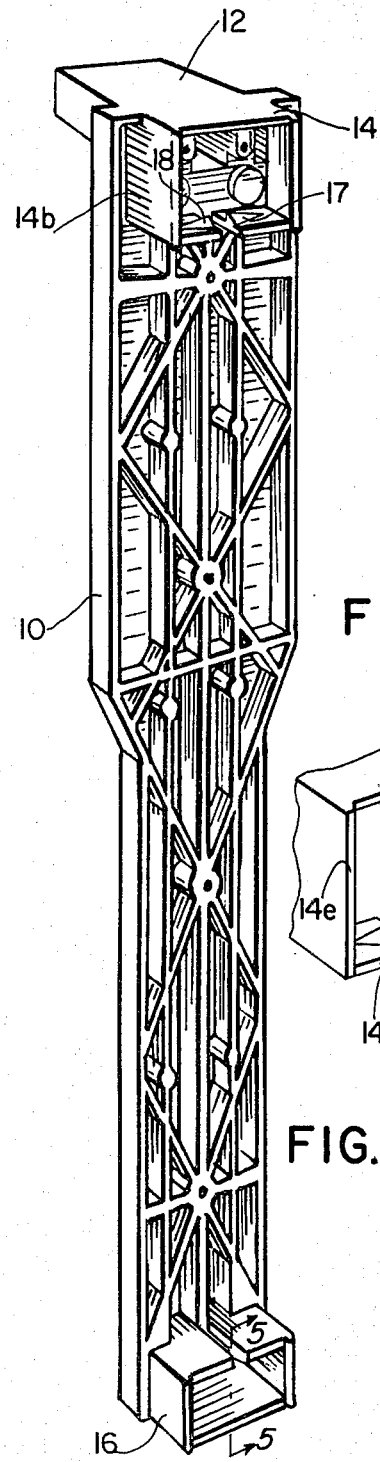
Figure 3:
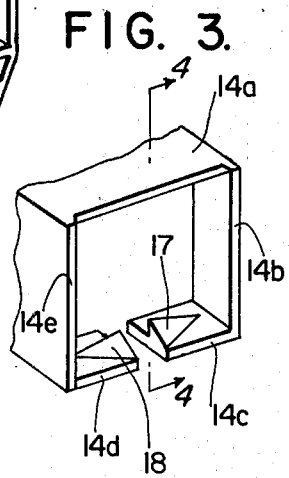
FIG. 3 is an enlarged fragmentary view of the upper socket of an end bar showing locking projections in accordance with the present invention.
Figure 4:
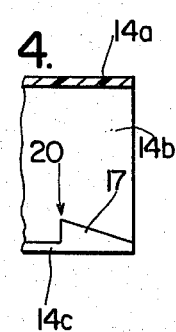
FIG. 4 is a fragmentary sectional view along 4—4 of FIG. 3.

The present invention centers around the idea of providing locking projections on the interior surfaces of sockets 14 and 16. In FIGS. 2-4 the rectangular socket 14 is seen to consist of sides 14a, 14b, 14c, 14d and 14e. A first locking projection 17 is provided on one bottom side 14c and a second locking projection 18 is provided on the other side 14d. As can perhaps best be seen in FIGS. 3 and 4, locking projections 17 and 18 are inclined upwardly as they extend inwardly into the socket 14 and they each terminate in a pointed edge 20. The sloped surface of projection 17 thus will serve as a sort of wedge to slightly compress a portion of the end of a wooden cross bar as it is being inserted into the socket. However, once the end of the cross bar has passed beyond pointed edge 20 the compressed portion of the end of the cross bar is no longer under a compressive force and if it is wooden it will usually then at least partially expand back toward its uncompressed configuration.

When the end of the wooden cross bar does expand, then the pointed edge 20 will act to prevent withdrawal of the cross bar. The locking projections thus serve to keep the cross bar in place once it has been inserted in the socket, despite rough handling, temperature changes and other conditions encountered by bee keepers. The locking projections usually hold the cross bar so securely that it can only be removed by breaking socket 14 or 16.

Figure 5:
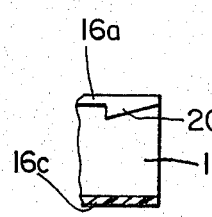
FIG. 5 is a fragmentary sectional view along 5—5 of FIG. 3.

The present invention also contemplates that at least one locking projection (and preferably two) will be provided in the lower socket 16. As is indicated in FIG. 5, the locking projection 21 is located on the upper side 16a of the socket 16 rather than on the bottom side 16c or the lateral side 16b. The locking projections in the lower socket 16 may have the same slope, contours, etc. as the locking projections 17 and 18 of FIG. 3, or they can be different. The slope of the projection is preferably between 18 and 80 degrees.

Although the locking projections could be located on any side of the sockets, it has been found that they usually function better when provided on the side of the socket that is "split" into two sections.

What is claimed is:

1. An end bar for a bee foundation frame that includes (a) an upper rectangular socket which has about the same interior cross sectional area and configuration as the cross sectional area and configuration of the top cross bar that is to be inserted in the socket, and (b) a lower rectangular socket which has about the same interior cross sectional area and configuration as the cross sectional area and configuration of the bottom cross bar that is to be inserted in the socket, the improvement which comprises (1) the lower horizontal portion of the upper socket and the upper horizontal portion of the lower socket each consisting of two sections that are spaced apart so as to leave an elongated opening between the inner facing edges thereof, (2) each of the two facing sections of each socket being provided with a locking projection on the inner surface thereof in a position immediately adjacent to said elongated opening that extends between the sections, (3) each of said two locking projections consisting of a pyramid having three upstanding triangular sides including a vertical backside that is aligned perpendicular to said elongated opening, an inner side that is parallel to and aligned with said elongated opening, and a sloping side which slopes toward the rear of the socket and upwardly from the section on which it is mounted, whereby, when the end of a cross bar is inserted into one of said sockets and pressed inwardly over and past the sloping sides of said locking projections, the cross bar will be held in said socket by said locking projections.

\* \* \* \* \*